(12) United States Patent
Takagi et al.

(10) Patent No.: US 7,039,287 B2
(45) Date of Patent: May 2, 2006

(54) DISPLAY ELEMENT, IMAGE OBSERVATION SYSTEM HAVING DISPLAY ELEMENT, AND IMAGE PROJECTION SYSTEM

(75) Inventors: Akinari Takagi, Tochigi-ken (JP); Hikaru Hoshi, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/093,204

(22) Filed: Mar. 28, 2005

(65) Prior Publication Data
US 2005/0220402 A1 Oct. 6, 2005

(30) Foreign Application Priority Data
Mar. 30, 2004 (JP) .............................. 2004-099142
Apr. 5, 2004 (JP) .............................. 2004-111228

(51) Int. Cl.
*G02B 6/10* (2006.01)
(52) U.S. Cl. ....................... 385/129; 385/130
(58) Field of Classification Search ............ 385/14–16, 385/24, 31, 129–132; 372/92–94
See application file for complete search history.

(56) References Cited
U.S. PATENT DOCUMENTS
2002/0009277 A1* 1/2002 Noda et al. .................. 385/130

2002/0159733 A1 10/2002 Flory et al.

FOREIGN PATENT DOCUMENTS

| EP | 1 326 132 A2 | 7/2003 |
|---|---|---|
| JP | 62-021123 | 1/1987 |
| JP | 2001-051271 | 2/2001 |
| JP | 2001-51271 A | 2/2001 |
| JP | 2001-175197 | 6/2001 |
| JP | 2002-091344 | 3/2002 |

OTHER PUBLICATIONS

European Patent Office; "European Search Report"; date of mailing Jul. 1, 2005; (3 pages).

* cited by examiner

*Primary Examiner*—Phan Palmer
(74) *Attorney, Agent, or Firm*—Morgan & Finnegan, LLP

(57) ABSTRACT

Provided is a small size, high resolution display element with an extremely high utilization efficiency of light emitted by a light source unit and a high contrast. A display element of the present invention has a photonic crystal, a light source unit, and a control unit. The control unit changes the resonance wavelength of point defect resonators formed within the photonic crystal, thus effecting a control between a state in which light guided from the light source unit to a linear defect waveguide is emitted to the outside of the photonic crystal, and a state where emission of light to the outside of the photonic crystal is blocked.

15 Claims, 12 Drawing Sheets

DISPLAY ELEMENT, IMAGE OBSERVATION SYSTEM HAVING DISPLAY ELEMENT, AND IMAGE PROJECTION SYSTEM

BACKGROUND OF THE INVENTION

1. Field of the Invention

The present invention relates to a display element having a fine periodic structure. For example, the present invention relates to a display device or an image observation system that displays an image by modulating light beam from a light source for every pixel.

2. Related Background Art

Self light emitting display devices such as PDPs, EL displays, and FEDs, and light bulb type display devices such as an LCD in which a back light and a space modulation element are combined together are known as conventional flat panel display devices. The display devices still have a lot of room for improvement, however, in their size, electric power consumption, display image contrast, moving image display characteristics, and the like. On the other hand, use of a display that guides light from a light source means to an optical fiber, extracts the light from the optical fiber for each pixel through a liquid crystal switch, and uses the light to excite a fluorescent substance to effect display has been proposed (Japanese Patent Application Laid-open No. 2001-51271) as a method for achieving saving of space, saving of electric power, and high image quality. Further, a two dimensional photonic crystal waveguide is known (U.S. Patent Application Publication No. 2002/009277). A linear and point defect is formed within a two dimensional photonic crystal having a refractive index with a two dimensional periodic distribution, thus forming a waveguide within the two dimensional photonic crystal. The light and electromagnetic waves propagating through the waveguide are guided in a direction perpendicular to surface.

In the display disclosed in Japanese Patent Application Laid-open No. 2001-51271, since light is extracted by breaking down the total internal reflection conditions of the optical fiber by change in refractive index of the crystal, it is difficult to locally change the refractive index. The extracted light thus expands without directionality, and cannot efficiently excite the fluorescent substances. Furthermore, light easily leaks out to adjacent pixels, and the image quality tends to decrease.

U.S. Patent Application Publication No. 2002/009277 discloses making light having a plurality of wavelengths incident into a two dimensional photonic crystalline waveguide, and guiding light having a predetermined wavelength, among all of the light propagating in the two dimensional photonic crystalline waveguide, in a direction perpendicular to surface (see FIG. 16). However, the refractive index of the two dimensional photonic crystalline structure provided with the refractive index distribution is not controlled so as to control light emission.

U.S. Patent Application Publication No. 2002/159733 discloses that light having a predetermined wavelength that coincides with a resonant wavelength of a resonator among all light propagating in a two dimensional photonic crystalline waveguide, is reflected so that the reflected light propagates in a direction opposite to the direction in which the light had been propagating, and the refractive index distribution of the resonator is changed so as to control the wavelength to be reflected. However, it does not disclose guiding the light propagating within the waveguide in a direction perpendicular to surface.

SUMMARY OF THE INVENTION

An object of the present invention is to provide a small size, high resolution display element which provides an extremely high utilization efficiency of light emitted from a light source, and which can easily provide a high contrast when used. In addition, another object of the present invention is to provide a display observation system and an image projection system that use the display element.

The present invention provides a display element including: a two dimensional or three dimensional photonic crystal having a photonic band gap in a predetermined wavelength region; light source means; and control means, wherein: the photonic crystal has a waveguide made from a linear defect, and a plurality of resonators made from point defects disposed close to the waveguide; the light source means guides light of the predetermined wavelength region to the waveguide; a resonance wavelength of each of the resonators can be changed according to a control signal from the control means; the control means effects a control between a first state in which light within the waveguide is emitted to an outside of the photonic crystal by setting the resonance wavelength to match a wavelength of the light guided from the light source means, and a second state in which emission of the light within the waveguide to the outside of the photonic crystal is blocked by setting the resonance wavelength to a wavelength that differs from the wavelength of the light guided from the light source means; and the plurality of resonators form pixels.

DESCRIPTION OF THE PREFERRED EMBODIMENTS

Embodiment 1

The basic concept of a display element of the present invention is explained using FIGS. 1A to 6B. It becomes possible to control the transmission and reflection characteristics of incident electromagnetic waves by periodically arranging structures that are finer than the wavelength of the incident electromagnetic waves. By then making the wavelength of the electromagnetic waves smaller, to a size on the order of the wavelength of light, it becomes possible to control the transmission and reflection characteristics of the light. This type of structure is known as a photonic crystal structure. Further, it is suggested that a reflective mirror having a reflectance of nearly 100%, with very slight light losses, can be achieved in a predetermined wavelength region by making the structure of the photonic crystal into a two dimensional or three dimensional fine periodic structure. The feature that a nearly 100% reflectance can be achieved in a predetermined wavelength region is explained by the concept of a so-called photonic bound gap (hereinafter called PBG), in comparison to an energy gap in a conventional semiconductor. The PBG inhibits the propagation of light within the fine periodic structure in a corresponding predetermined wavelength region.

Figure 1A:
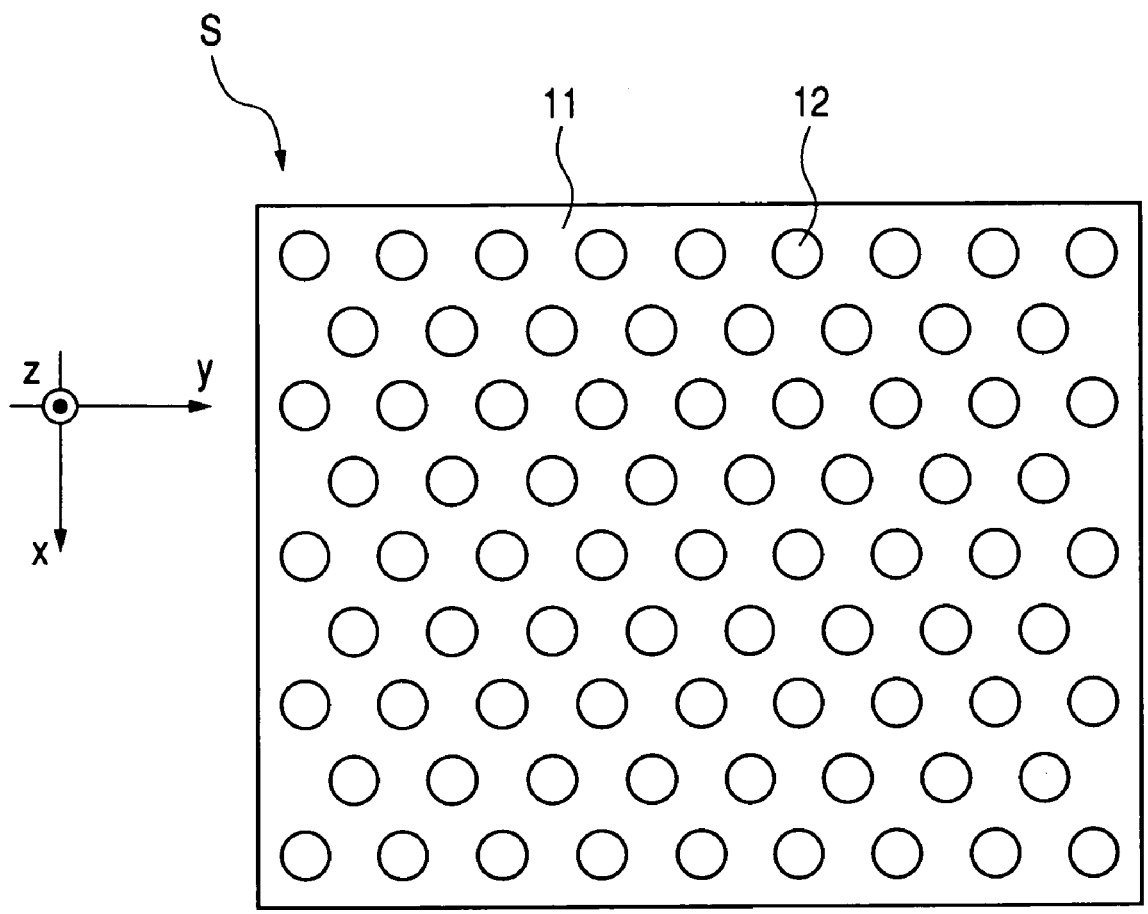
FIGS. 1A and 1B are diagrams that explain a display element according to the present invention.

FIG. 1A shows a photonic crystal having a two dimensional fine periodic structure, which is a basic structure S constituting the display element according to the present invention. Circular cylinders 12 made of a second material having refractive index n2 that is less than refractive index n1 of a first material are arranged in a triangular lattice shape within a flat-shaped slab structure 11 made from the first material. The first and second materials are transparent with respect to a visible light wavelength region. A PBG can be formed in a desired wavelength region by optimizing the refractive indices n1 and n2 of the materials, the diameter of the circular cylinders 12, arrangement spacing, and the like.

Figure 1B:
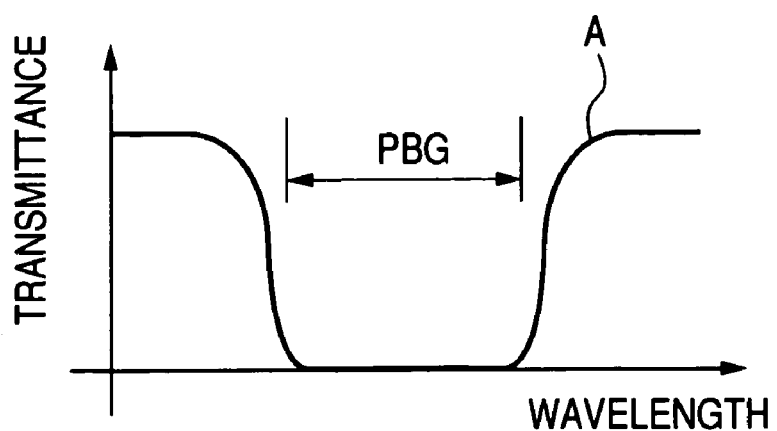

FIG. 1B shows a spectral transmission factor A in a y-direction of linearly polarized light in which the oscillation direction of an electric field lies within a slab surface (within an x-y cross section) of the element structure S. Referring to FIG. 1B, a wavelength region having a low transmittance factor indicates a PBG. Light in the wavelength region corresponding to the PBG thus cannot propagate in an inner portion of the basic structure S. As a result, the light is completely reflected by a surface of the basic structure S, and cannot enter an inner portion of the basic structure S. Although FIG. 1B shows the spectral transmission factor A in the y-direction, a similar PBG is also formed with respect to light propagating in any direction within an x-y plane. It should be noted that it is preferable that a ratio the refractive index n1 to the refractive index n2 of the materials (n1/n2) be equal to or greater than 2 in order to expand the wavelength region corresponding to the PBG. A nitride semiconductor such as GaN or a dielectric such as $TiO_2$ and $Ta_2O_5$ can be used as the first material forming the slab structure 11, while air or the like can be used as the second material forming the circular cylinders 12, for example.

Figures 2A, 2B:
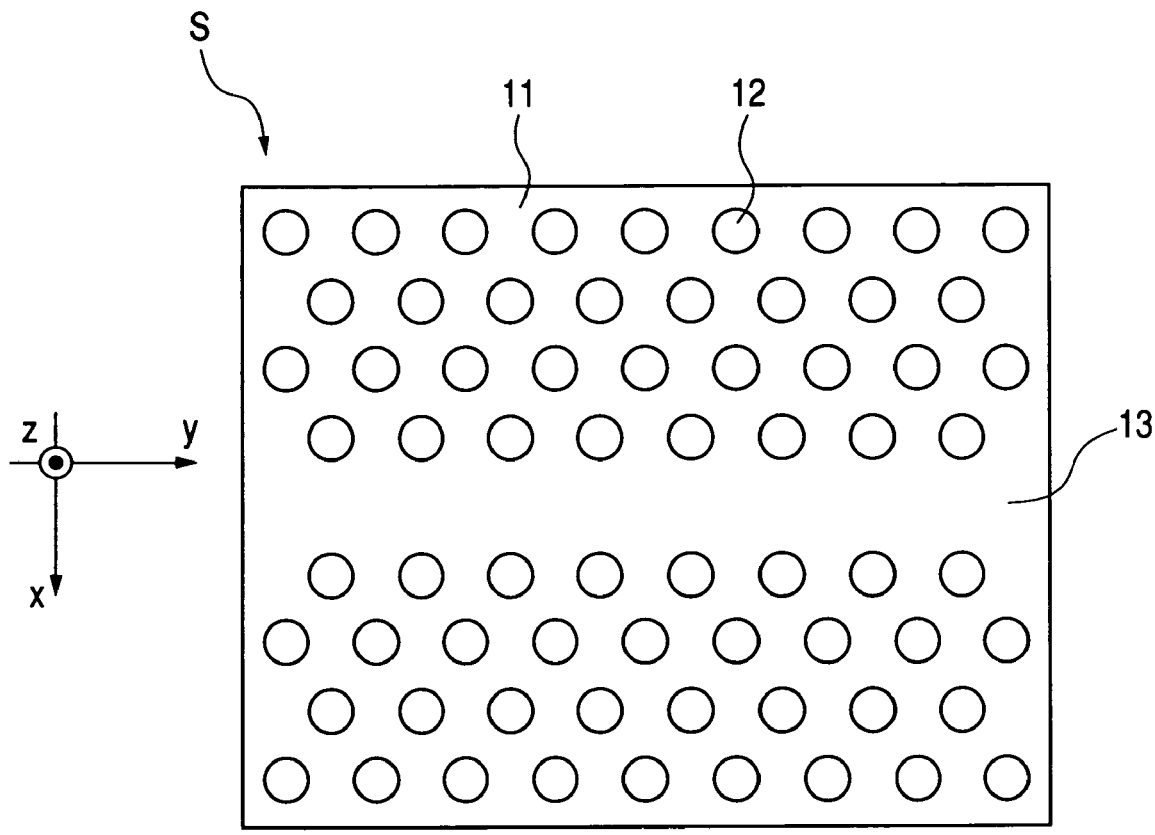
FIGS. 2A and 2B are diagrams that explain a case where a linear defect is formed in a display device according to the present invention.

FIGS. 2A and 2B show a case where a linear defect that disturbs the periodicity is formed within the slab structure S shown in FIG. 1A. A waveguide mode exists in the linear defect formed within the basic structure S, which is a photonic crystal, thus forming a low loss waveguide 13. Conventionally, when a waveguide like the waveguide 13 is formed, light having a wavelength within the PBG and incapable of propagating the inner portion of the photonic crystal becomes capable of propagating through the waveguide 13. As a result, a spectral transmission factor B of the low loss waveguide portion for linear polarized light with the oscillation direction of the electric field lying within the slap plane (within the x-y plane) is as shown in FIG. 2B, for example. A waveguide wavelength region α, where propagation is permitted, is produced within the wavelength region of the PBG.

The linear defect is formed by partially changing the number of periods of the periodic structure, such as by not arranging the circular cylinders 12 in a linear manner, or by linearly arranging circular cylinders having different diameters. The center wavelength of the waveguide wavelength region α, as well as the wavelength bandwidth, can be set to desired values by changing the diameter of the circular cylinders 12, the width of the waveguide 13, or the diameter or the shape of the circular cylinders 12 adjacent to the waveguide 13.

It should be noted that as described above, slabs are made from a material having a relatively high refractive index n1. Accordingly, light propagating in a direction substantially parallel to a surface of the slab does not leak out in a z-direction because it is totally internally reflected by the slab surface.

When a linearly polarized light beam with the oscillation direction of the electric field lying within the slab plane (x-y plane) of the slab structure S is guided from a light source (not shown) to the waveguide 13, the propagation state of the light beam changes depending upon the wavelength of the light beam being guided. Light in the wavelength region α is within the PBG and within the light guide wavelength region, and thus propagates within the waveguide 13 with little loss. Light in a wavelength region β is within the PBG and outside of the waveguide wavelength region, and thus is not allowed to exist within the basic structure S that contains the waveguide 13. Accordingly, the light is reflected by the surface of the basic structure S. Light in a wavelength region γ is outside of the PBG, and thus propagates not only through the inside of the waveguide 13 but also through the entire basic structure S.

Figure 3A:
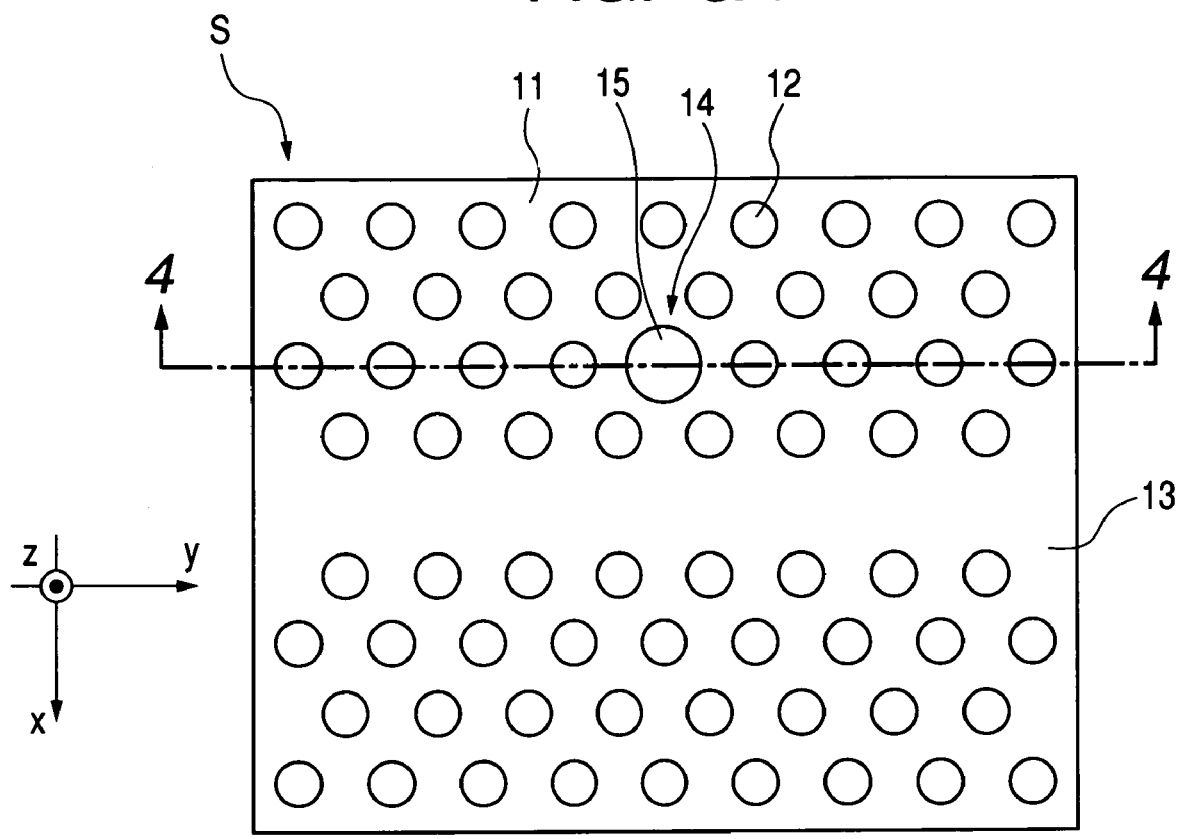
FIGS. 3A and 3B are diagrams that explain a case where a linear defect waveguide and a point defect resonator are formed in a display element according to the present invention.
Figure 3B:
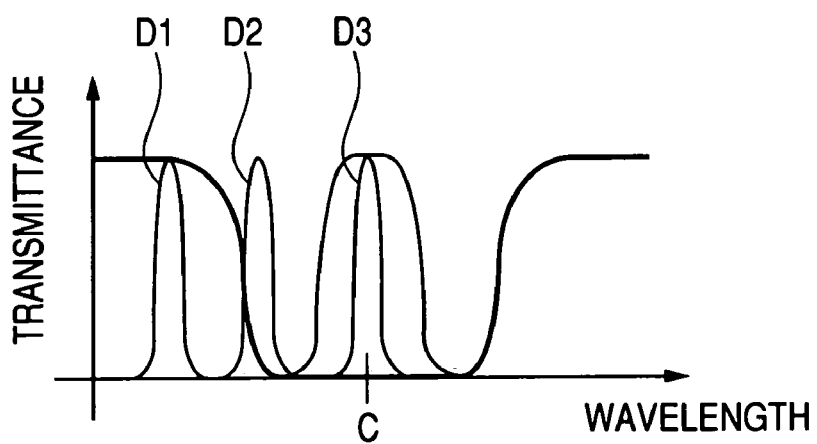

FIGS. 3A and 3B show an example of forming a resonator 14 by a point defect that disturbs the periodicity within the slab structure S. A PBG develops in the photonic crystal due to light diffraction and multiple scattering caused by the periodic refractive index structure. Accordingly, a fixed proportion of light is transmitted for cases where the number of periods of the periodic refractive index structure is small. Referring to FIG. 3A, by forming the point defect in the vicinity of the waveguide 13, thus forming the resonator 14, light having a wavelength that matches the resonance wavelength of the resonator 14 set within the waveguide wavelength region of the waveguide 13 can be extracted at a fixed proportion from the light propagating within the waveguide 13. The extracted light is transmitted to the surface of the slab while it resonates within the resonator 14, and emitted in the z-direction.

It is preferable that the number of periods of the periodic structure between the waveguide 13 and the resonator 14 be on the order of 1 to 3 for cases where the proportion of light extracted from within the waveguide 13 to the resonator 14 is high. On the other hand, for cases where the number of periods is equal to or greater than 10, the light is nearly completely reflected within the period, and it is difficult to extract light from within the waveguide 13. A number of periods equal to or greater than 10 is thus not preferable. However, the relationship between the number of periods of the periodic structure and the reflectance changes according to the refractive index and the photonic crystalline structure of the material forming the periodic structure, the waveguide formed by the defect structure, the eigen mode shape of the resonator, and the Q factor within the plane and in a perpendicular direction. Accordingly, the number of periods of the periodic structure between the waveguide 13 and the resonator 14 may be suitably set according to the periodic structure used.

When the resonator 14 is completely symmetric in the z-direction, the light is emitted in both positive and negative directions (upward and downward directions as seen in the plane of the drawing). By changing the diameter of the circular cylinders in the z-direction, or by sandwiching at least the vicinity of the resonator 14 by using two different materials having different refractive indices to thereby introduce asymmetry in the z-direction to the resonator 14, the light is emitted in a desired direction. For example, the light is emitted only in the positive z-direction.

Point defects used to form the resonator may be formed by changing the diameter of, by shifting the position of, or by removing one or a plurality of the circular cylinders 12, by using a third material that has refractive index different from the refractive indices n1 and n2, or the like. The resonance wavelength of the resonator 14 can be set to a desired value by changing the shape or the refractive index of the point defects, and the extraction efficiency can be set to a desired value by changing the spacing between the waveguide 13 and the resonator 14.

Further, the extraction of the light can be switched on and off by forming the resonator 14 using a non-linear medium 15 having an electro-optic effect whereby the refractive index thereof changes upon application of an electric field, and by changing the resonance wavelength by changing the refractive index of the non-linear medium 15 through application of an electric field.

FIG. 3B shows changes in the resonance wavelength of the resonator 14 when the refractive index of the non-linear medium 15 is changed. The resonance wavelength of the resonator 14 changes to the long wavelength side from D1 to D2 to D3 as shown in FIG. 3B as the refractive index of the non-linear medium 15 becomes larger. The light within the waveguide 13 cannot enter the resonator 14 when the resonance wavelength of the resonator 14 differs from the wavelength of the light propagating within the waveguide 13. Therefore, when light having a wavelength C is guided within the waveguide 13, the extraction of light in the z-direction through the resonator 14 can be turned on and off by controlling an electric field to control the refractive index of the non-linear medium 15, switching the resonance frequency of the resonator 14 between D1 (off) and D3 (on). $LiNbO_3$, $BaTiO_3$, $ZnO$, liquid crystals, and the like having an electro-optic effect can be used as the non-linear medium 15.

Figure 4A:
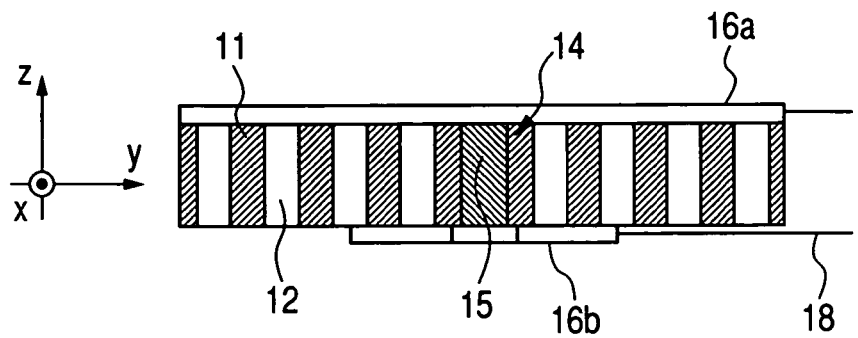
FIGS. 4A and 4B are cross sectional views of FIG. 3A taken along a line 4—4.

FIG. 4A is a cross sectional view of FIG. 3A taken along a line 4—4. A transparent electrode 16a is formed on an upper surface of the slab structure 11, and a TFT structure 16b is formed on a lower surface of the slab structure 11. A signal line 18 sends a TFT control signal. An electric field is thus applied to the non-linear medium 15 having an electro-optic effect, a magneto-optic effect, a ferroelectric effect, and the like.

Figure 4B:
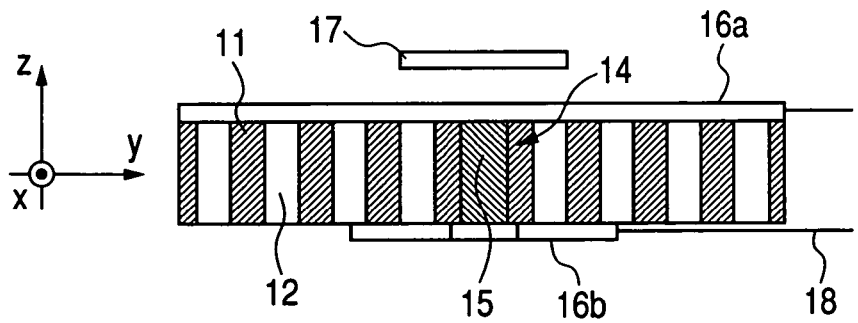
Figure 5:
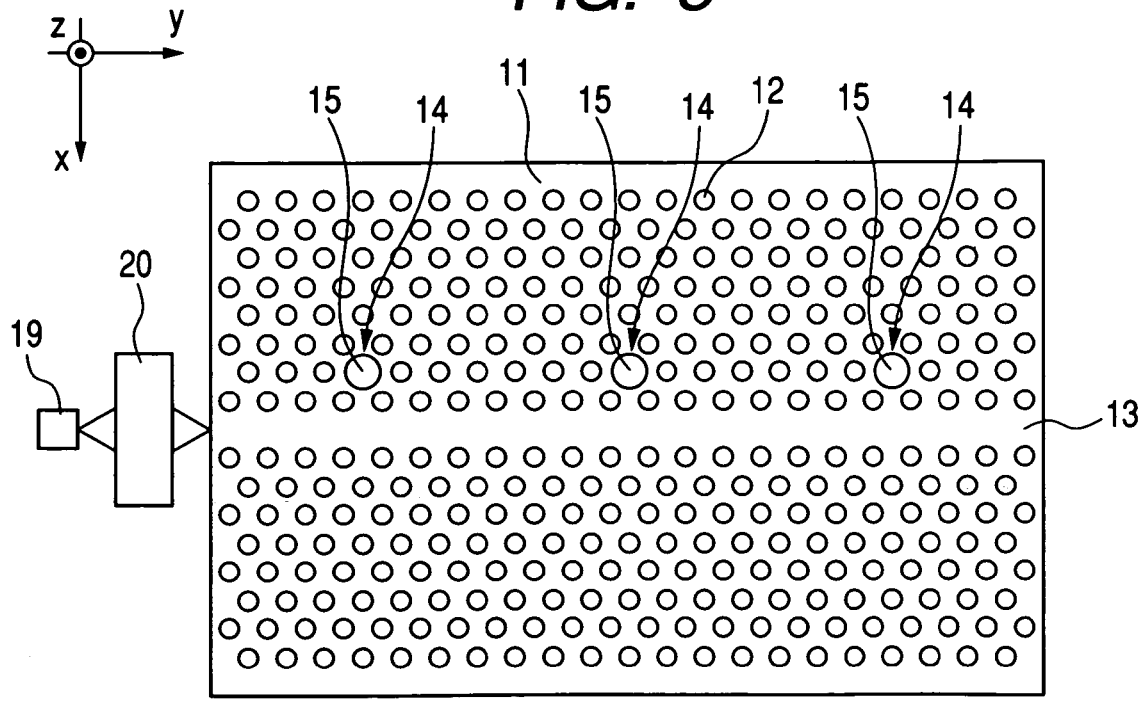
FIG. 5 is a schematic diagram of main portions of Embodiment 1 of a display element of the present invention.
Figure 6A:
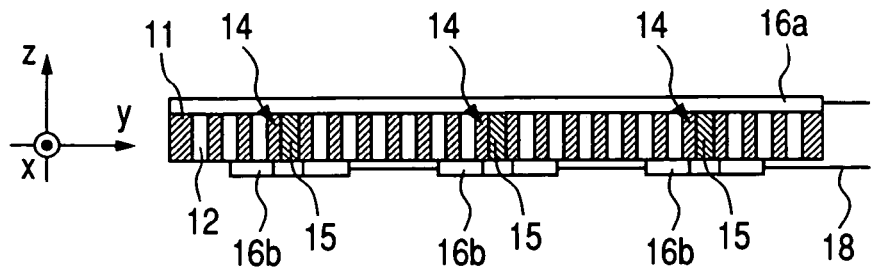
FIGS. 6A and 6B are cross sectional views of FIG. 5.
Figure 6B:
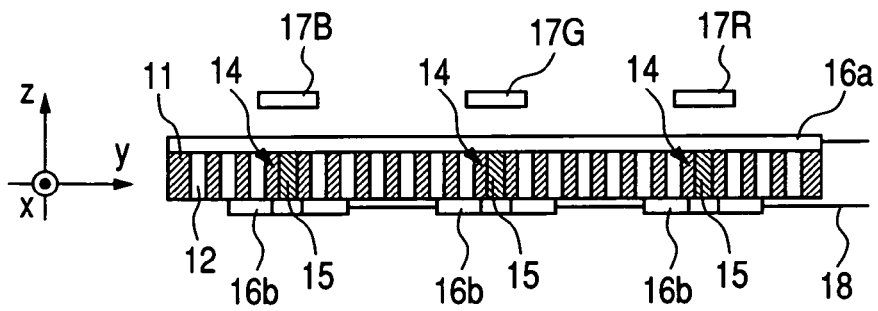

Further, by setting the difference between the refractive index of a material forming the transparent electrode 16a and the refractive index of the non-linear medium 15 to be smaller than the difference between the refractive index of a material forming the TFT structure 16b and the refractive index of the non-linear medium 15, asymmetry is introduced in the vertical direction of the resonator 14, forming a structure in which light is extracted only in the positive z-direction. The resonator 14 thus forms a pixel. As shown in FIG. 4B, a wavelength converting portion 17 may also be provided in the positive z-direction with respect to the resonator 14. A light beam that is emitted in the positive z-direction (light in the ultraviolet region) enters the wavelength converting portion 17, is converted into visible light, and then emitted in the positive z-direction. The resonator 14 thus forms a pixel. The light beam emerging from the resonator 14 has strong directionality in the z-direction. Consequently, the light can be efficiently guided to the wavelength converting portion 17. A fluorescent substance, for example, may be used as the wavelength converting portion 17. The wavelength of the light from the light source means may be set to the peak wavelength for absorption and excitation of the fluorescent substance, performing conversion with good efficiency. FIG. 5 is a top view of the basic configuration of a display element according to the present invention, and FIGS. 6A and 6B show cross sectional views of the display element. The display element has a plurality of the resonators 14 arranged in parallel to the direction of the waveguide 13. As shown in FIGS. 6A and 6B, the TFT structure 16b is formed independently in each of the resonators 14. It thus becomes possible to perform on/off control separately for each of the resonators 14. The resonators 14 each form a pixel of the display element.

Light emerging from a light source means 19 containing a laser light source is guided to the waveguide 13 by a coupling optical system 20. A control means (not shown) turns on the TFT structures 16b of the resonators 14 corresponding to pixels for which display is desired, thus applying an electric field. Light is then extracted in sequence from the waveguide 13, through the resonators 14, according to the principle shown in FIGS. 3A and 3B. Each of the resonators 14 can thus display an image as one pixel. Further, for cases as shown in FIG. 5 where a plurality of the resonators 14 are provided close to one waveguide 13, a problem develops in that the intensity of light extracted from resonators far from the light source decreases when light is extracted from resonators very close to the light source. In this case a scanning image is observable as one image by using the control means (not shown) to perform the extraction of light in sequence within an allowable amount of time for an afterimage in the eyes of an observer, between the plurality of resonators 14 disposed close to the one waveguide 13. Furthermore, it also becomes possible to perform gray scale display by changing the output of the laser light source 19 in synchronism with the display of each of the pixels (on/off control of the resonators).

In FIG. 5, the arrangement interval between the circular cylinders 12 is several hundred nm in order to form the PBGs in the visible light region. Accordingly, by setting the arrangement interval of the resonators 14 as equal to or greater than several μm, and by disposing the plurality of circular cylinders 12 (10 periods, for example) so that the photonic crystal between the resonators can nearly completely reflect the light used for display, the influence exerted by adjacent resonators is eliminated.

The laser light source used as the light source means 19 is disposed so that, regarding the polarization direction of emerging light, the oscillation direction of the electric field lies within the slab plane (x and y directions). Further, the coupling optical system 20 is set so that the mode profile at an incident side of the waveguide 13 coincides with the eigen mode of the waveguide 13. Emerging light is thus guided to the waveguide 13 with good efficiency. By using a configuration as described above, a small size, high resolution display element having high contrast, and with which the utilization efficiency of light emerging from the light source means 19 is extremely high, can be achieved.

The arrangement of the circular cylinders 12 in FIGS. 1A to 5 is a triangular lattice shape. However, other lattice arrangements, such as a square lattice or a honeycomb lattice may also be used. Further, the periodic structure formed in the slab structure 11 by the second material need not be cylindrical. The periodic structure may also be a triangle pole, a square pole, a hexagonal pole, a sphere, a spheroid, or the like. Furthermore, the refractive index $n2$ of the circular cylinders 12 may also be set larger than the refractive index $n1$ of the slab structure 11. However, it is preferable that the ratio between the refractive indices of the respective materials ($n2/n1$) be equal to or greater than 2. In order to widen the wavelength band of the PBG, it is preferable that the ratio between the refractive indices of respective materials ($n2/n1$) be equal to or greater than 3. Compound semiconductors such as GaAs, InP, GaN, and ZnS, Intrinsic semiconductors such as Si, dielectrics such as $TiO_2$, and metals can be used as high refractive index materials. Dielectrics such as $SiO_2$, high molecular weight organic materials such as PMMA, air, and the like can be used as low refractive index materials.

Figure 7:
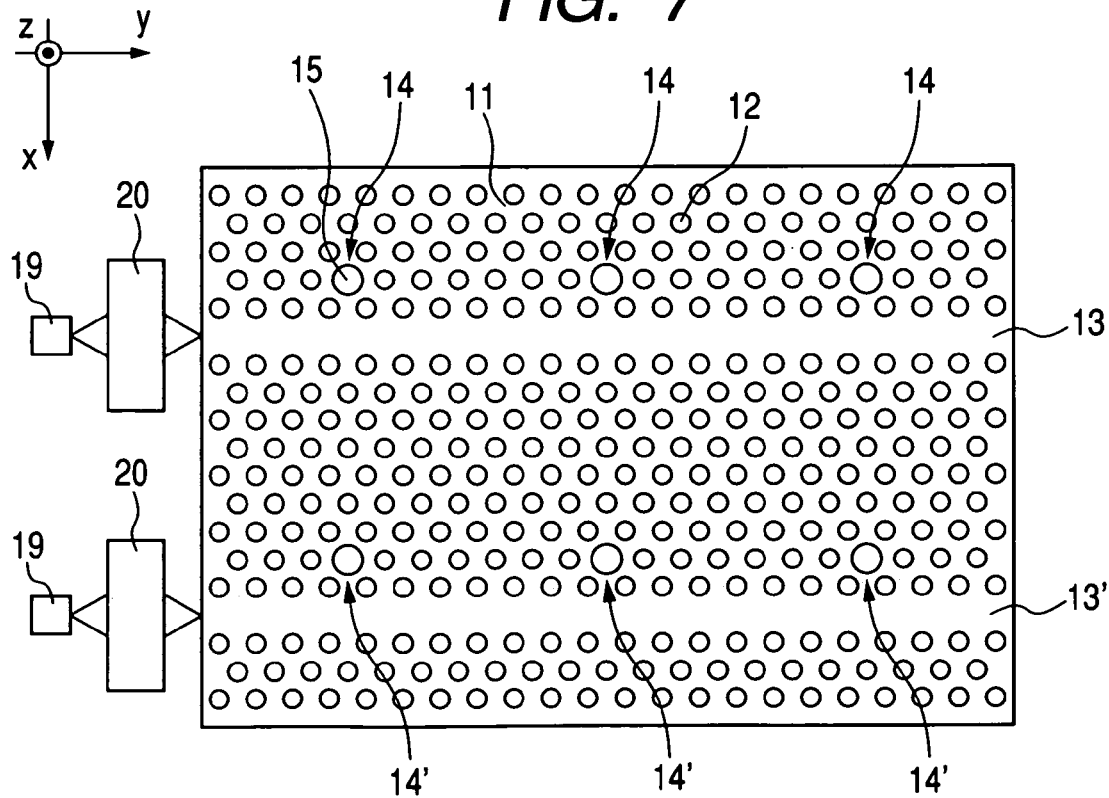
FIG. 7 is a schematic diagram of main portions of Embodiment 2 of a display element of the present invention.

Further miniaturization becomes possible by disposing a photonic crystal laser with a resonator made from photonic crystal as a light source within the slab structure 11. Furthermore, coupling losses due to the coupling optical system can be reduced, and the utilization efficiency of light can be further increased. FIG. 7 shows Embodiment 2 of a basic configuration of a display element according to the present invention. The display element of this embodiment is achieved by aligning a plurality of arrays of the waveguide 13 and the resonators 14 shown in FIG. 5 in the x-direction. The waveguide 13 and resonators 14' are sufficiently spaced apart from each other, thus keeping the resonators 14' from influencing the waveguide 13. A two dimensional display element is formed by thus arranging a plurality of pixels (resonators) in the x and y directions (for example, 800 in the y-direction and 600 in the x-direction).

Figure 8:
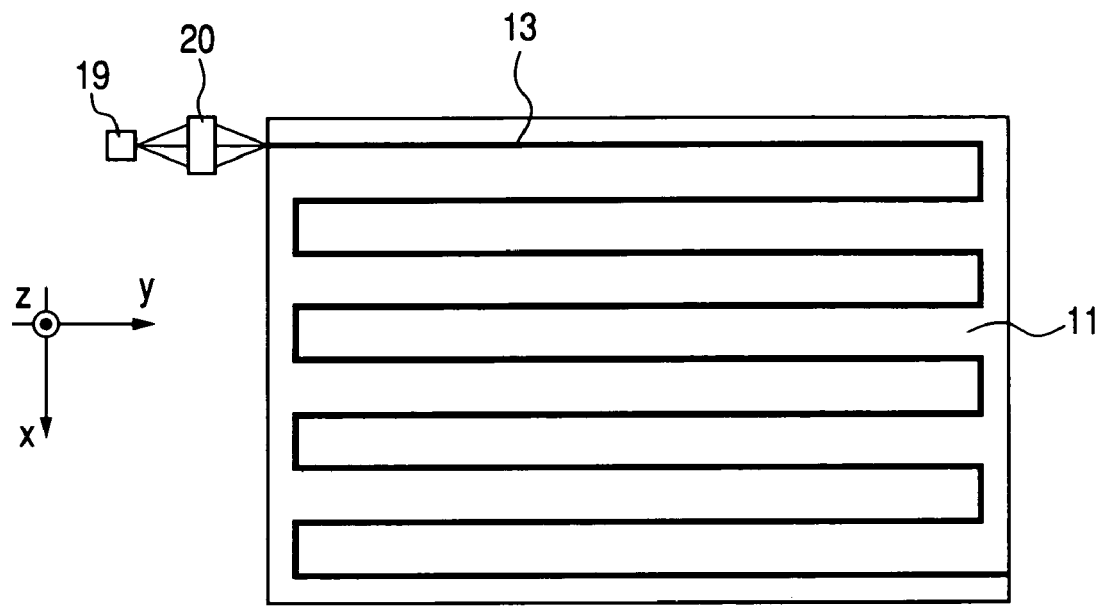
FIG. 8 is a schematic diagram of main portions of Embodiment 3 of a display element of the present invention.

FIG. 8 shows Embodiment 3 of a basic configuration of a display element according to the present invention. The laser light source of the light source means 19 may be disposed in each of the waveguides 13 as shown in FIG. 7, or, alternatively, all of the waveguides may be connected, and light may be supplied to all of the pixels by using one laser light source as shown in FIG. 8. It should be noted that portions other than the waveguides 13 and the light source means 19 are omitted from FIG. 8 for the sake of simplicity.

Figure 9:
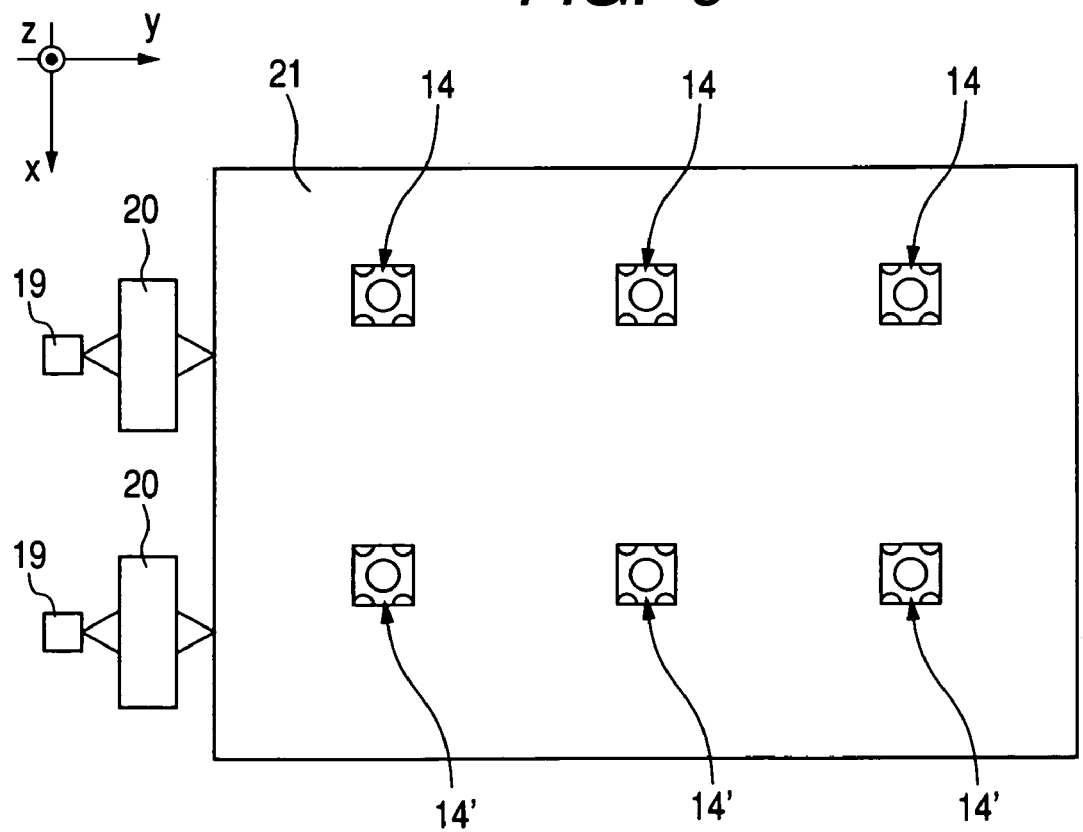
FIG. 9 is a diagram that explains an example of forming a light shielding member on a display element of the present invention.

FIG. 9 shows an example in which a light blocking member is provided to portions of a display element of the present invention other than pixels. There is a possibility of light scattering or leaking from portions other than the resonators 14 when the conditions for allowing total internal reflection by the surface of the slab structure 11 are not met in the display element as shown in FIG. 5 due to irregular arrangement of the circular cylinders, surface roughness, or the like caused by manufacturing errors or the like. Such light causes the image quality of the displayed image to deteriorate. By forming a light blocking portion 21 in portions of a display surface side (side from which display light is emitted) other than the upper surfaces of the resonators in order to block light of this type as shown in FIG. 9, a very high display quality can be obtained.

A compact, high resolution, two dimensional display element having high efficiency and high image quality, and a display that contains the display element, can thus be achieved as described above by arranging a plurality of the resonators 14 in the x and y directions, and using a control circuit (not shown) to turn the resonators corresponding to each of the pixels on and off within an allowable amount of time for an afterimage in the eyes of an observer.

Figure 10:
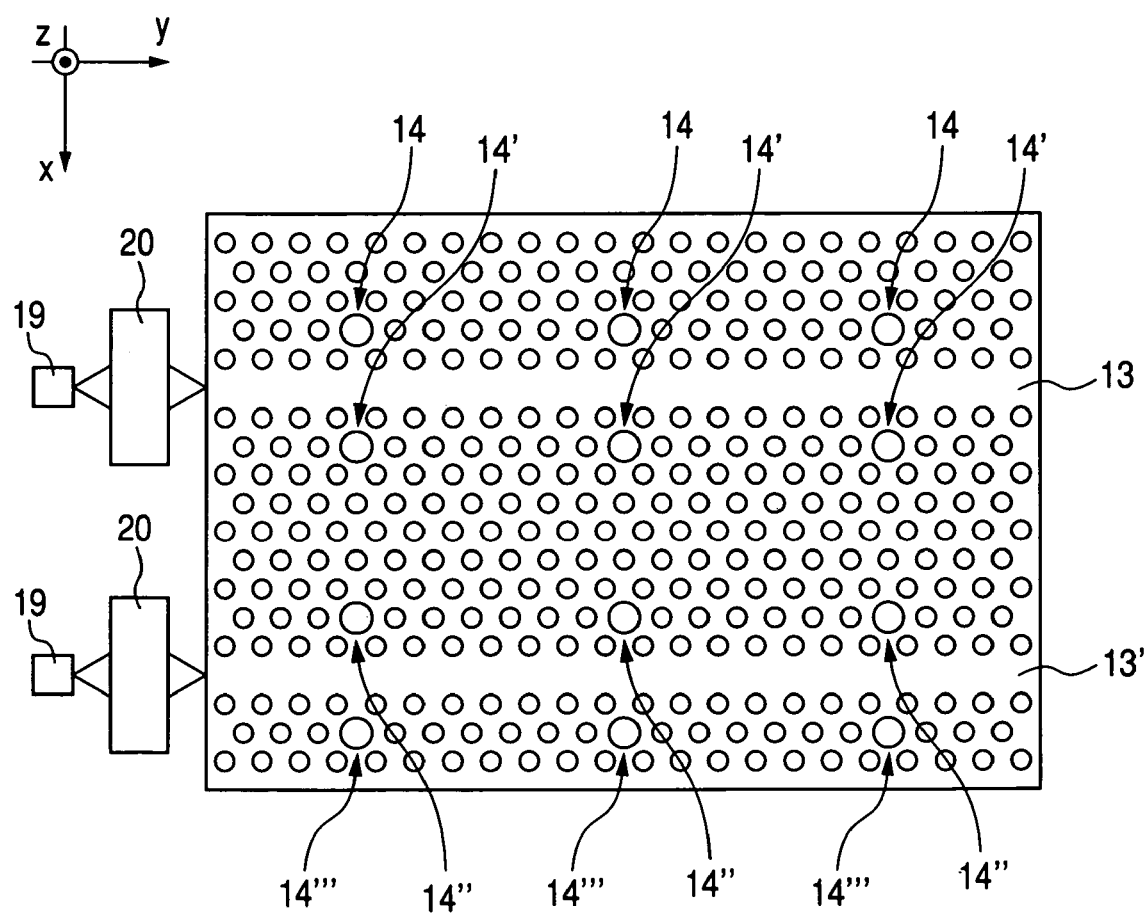
FIG. 10 is a schematic diagram of main portions of Embodiment 4 of a display element of the present invention.

FIG. 10 shows Embodiment 4 of a basic configuration of a display element according to the present invention. The resonators 14 are arranged on both sides of the waveguide 13 with the display element shown in FIG. 10, thus effectively increasing the density of the pixels, as compared to the display element shown in FIG. 7. Reference numerals identical to those of FIG. 7 are used for portions that are the same as those of FIG. 7. By using such a configuration, it becomes possible to simplify the structure and to reduce the number of the laser light sources. It should be noted that it is preferable to dispose the resonators 14' and resonators 14" at positions sufficiently spaced apart from each other in order to avoid mutual influence therebetween. For example, the resonators 14' and 14" may be disposed in positions spaced apart by 10 or more periods of the periodic structure.

Figure 11:
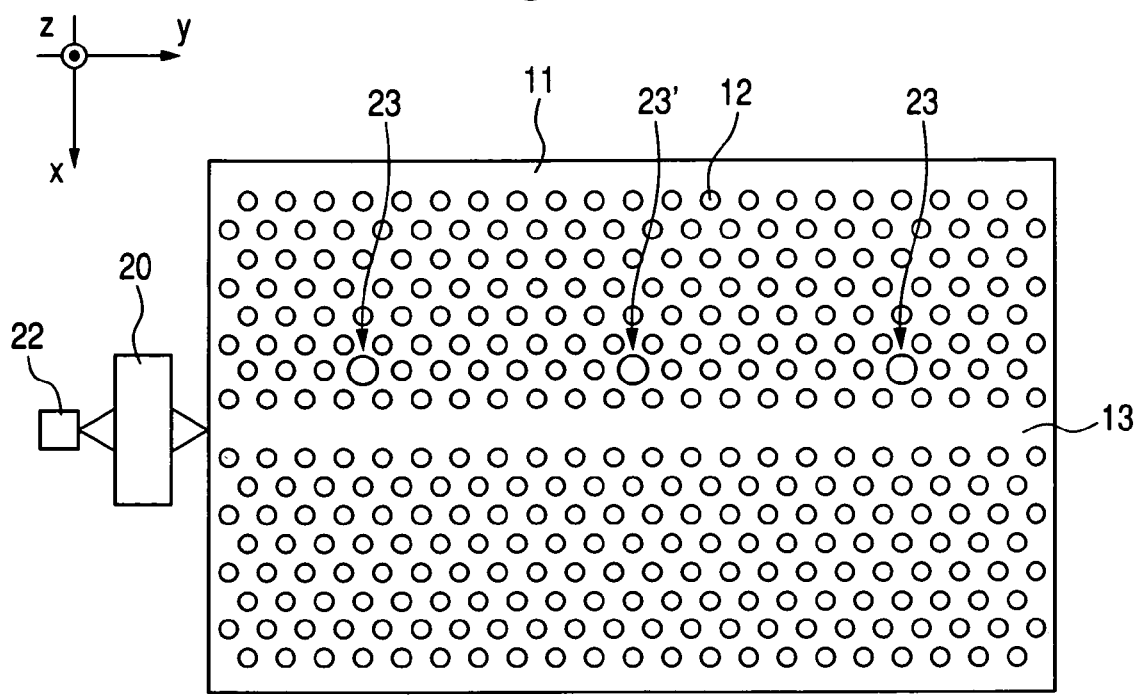
FIG. 11 is a schematic diagram of main portions of Embodiment 5 of a display element of the present invention.

FIG. 11 is a schematic diagram of main portions of Embodiment 5 of the present invention. In particular, FIG. 11 shows a display element capable of displaying a plurality of colors. The basic structure of Embodiment 5, namely the arrangement of the resonators 14 close to the waveguide 13, is similar to the display element shown in FIG. 5. However, the display element of Embodiment 5 differs from that of FIG. 5 in that a light source 22 capable of emitting a plurality of wavelengths of light is used, and in those resonators 23 and 23' having different resonance wavelengths are used. Colors corresponding to different wavelengths can be displayed by guiding light from the light source means 22, which contains a plurality of laser light sources of wavelengths $\lambda 1$ and $\lambda 2$ within the waveguide wavelength region of the waveguide 13, to the waveguide 13, and extracting each of the wavelengths of light from the waveguide by using the resonators 23 and 23', which have resonance wavelengths of $\lambda 1$ and $\lambda 2$, respectively.

Although a case in which the light source means 22 emits light having two wavelengths is explained here, the present invention is not limited to this. A light source that emits light having three or more wavelengths, and resonators corresponding to each of the three or more wavelengths may also be combined and used. In addition, although a case in which a light source that emits light having a plurality of wavelengths is explained in FIG. 11, it is also possible to connect a plurality of light sources, each of which emits light having a different wavelength, to the waveguide 13. In addition, a light source that emits light possessing a fixed spread within the PBG of the photonic crystal that serves as the base may be used as the light source, and a resonator corresponding to a desired wavelength may be combined and used.

Figure 12:
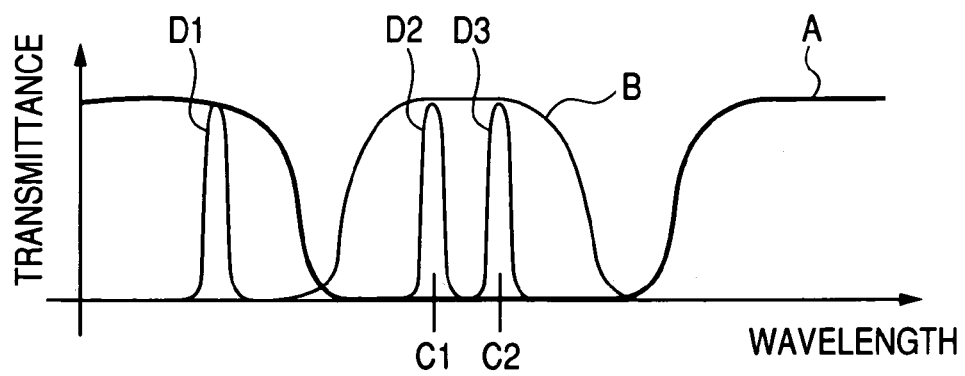
FIG. 12 is a diagram that shows characteristics of a resonator having a plurality of resonance wavelengths.

FIG. 12 shows characteristics of a resonator having a plurality of wavelengths. A plurality of colors can be displayed by one resonator (pixel) by using a resonator that possesses characteristics like those of FIG. 12.

As described above, the resonance frequency of the resonators can be changed by controlling the refractive index of the non-linear medium that forms the resonator by applying an electric field. In FIG. 12, symbol A denotes a spectral transmission factor of the basic structure, symbol B denotes a waveguide wavelength region of a linear defect waveguide, symbols C1 and C2 denote light source wavelengths propagating within the waveguide, and symbols D1, D2, and D3 denote resonance wavelengths of a resonator when an applied voltage is changed to voltages V1, V2, and V3, respectively. A control circuit (not shown) applies the voltage V2 to the non-linear medium when it is desired to display a color corresponding to the wavelength C1. The control circuit applies the voltage V3 to the non-linear medium when it is desired to display a color corresponding to the wavelength C2. It thus becomes possible to display a plurality of colors by using one resonator.

A small size, high resolution two dimensional display element having high efficiency, high image quality, and which is capable of displaying a plurality of colors, such as the three colors of red, green, and blue, and a display device that contains the display element, can thus be achieved according to the configuration described above.

Figure 13A:
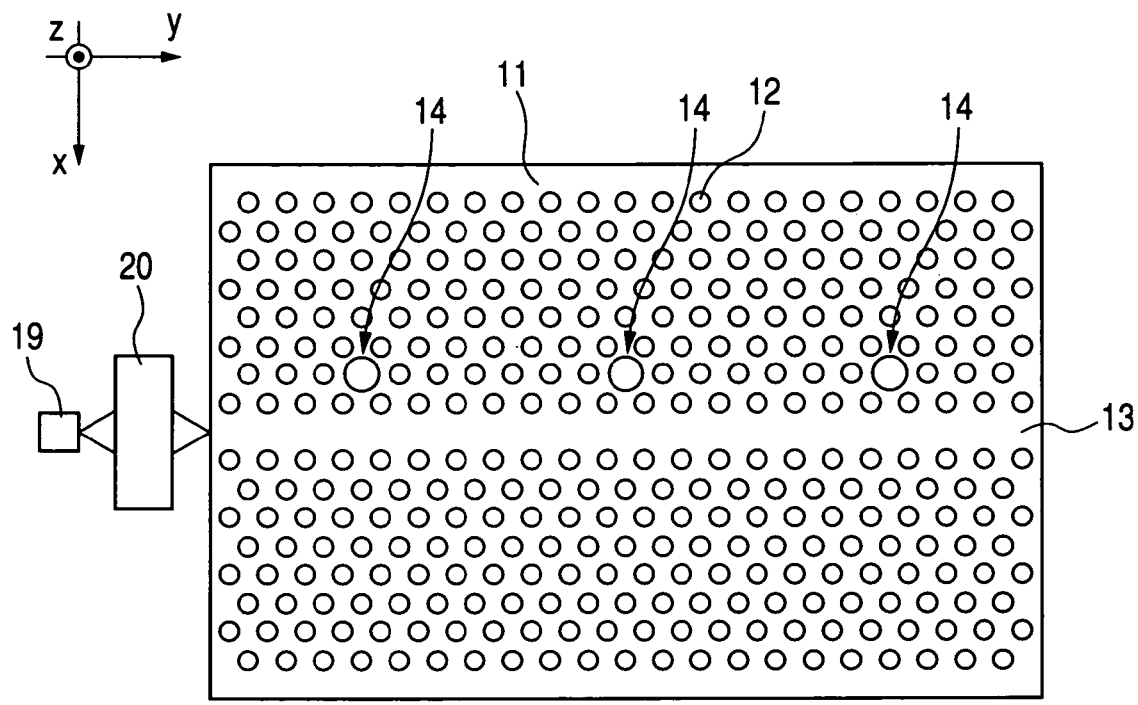
FIGS. 13A and 13B are schematic diagrams of main portions of Embodiment 6 of a display element of the present invention.
Figure 13B:
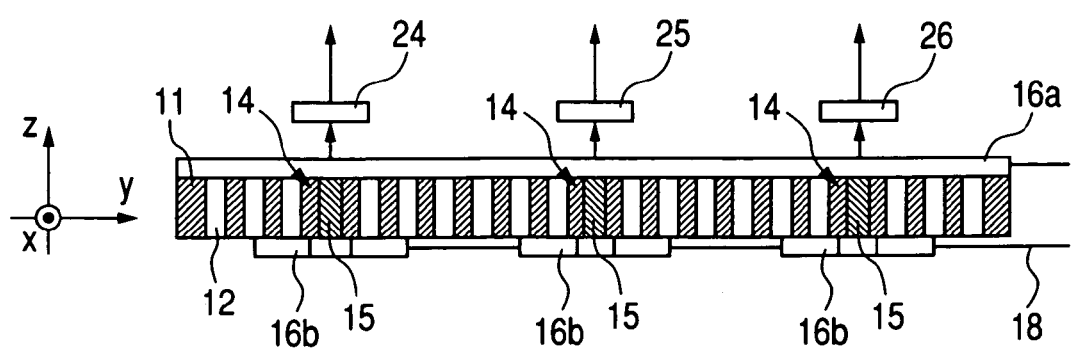

FIGS. 13A and 13B are schematic diagrams of Embodiment 6 of the present invention, and show a display element that displays a plurality of colors. The basic structure of Embodiment 6 is the same as that of Embodiment 1 shown in FIG. 5. Embodiment 6 differs from Embodiment 1, however, in that a plurality of types of converter portions 24, 25, and 26 are used as wavelength converter portions to convert light having a single wavelength into a light having a plurality of different wavelengths.

The wavelength of the light beam from the light source means 19 is taken to have a wavelength in the ultraviolet region, for example 380 nm. By using an ultraviolet excited red color fluorescent substance such as $Y_2O_2S$:Eu in forming the converter portion 24, an ultraviolet excited green color fluorescent substance such as $(Ba,Mg)Al_{10}O_{17}$:Eu,Mn in forming the converter portion 25, and an ultraviolet excited blue color fluorescent substance such as $(Sr,Ca,Ba,Mg)_{10}$·$(PO_4)_6Cl_2$:Eu in forming the converter portion 26, a small size, high resolution, two dimensional display element having high efficiency, high image quality, and which is capable of color display by the three colors of red, green and blue, and a display device including the display element, can be achieved.

Figure 14A:
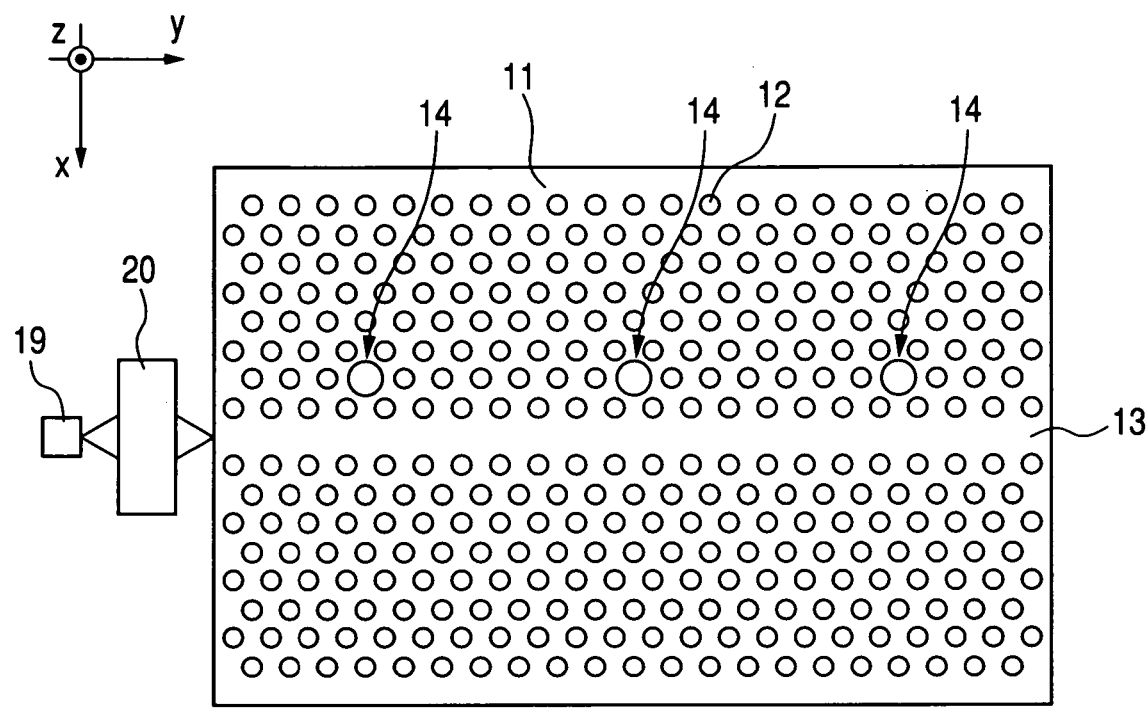
FIGS. 14A and 14B are schematic diagrams of main portions of Embodiment 7 of a display element of the present invention.
Figure 14B:
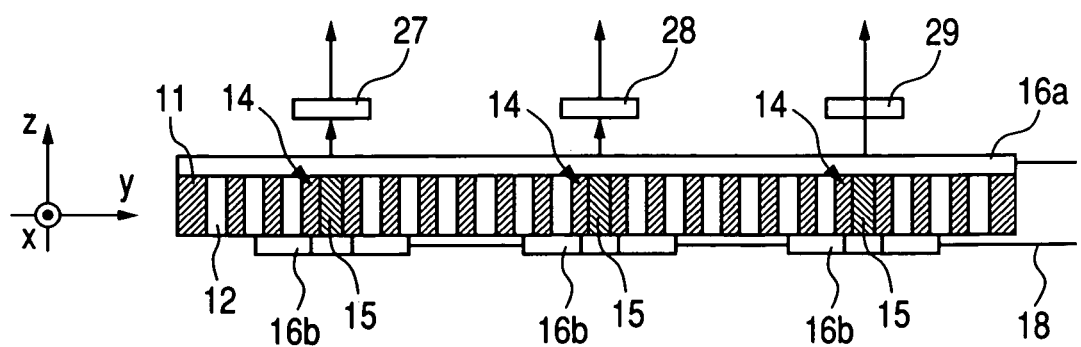

FIGS. 14A and 14B are schematic diagrams of Embodiment 7 of the present invention. Embodiment 7 represents another embodiment of a display element that displays a plurality of colors. The basic structure of Embodiment 7 is the same as that of Embodiment 6 shown in FIGS. 13A and 13B. Embodiment 7 differs from Embodiment 6, however, in that a plurality of types of converter portions 27 and 28 are used as wavelength converter portions to convert light of a single wavelength into light having a plurality of different wavelengths, and in that there is provided a pixel in which a window member (glass member) 29 is arranged.

The wavelength of the light beam from the light source means 19 is taken to have a wavelength in the blue color region, for example 450 nm. By using an organic red color fluorescent substance such as rhodamine for the converter portion 27, an organic green color fluorescent substance such as FITC or GFP for the converter portion 28, and by extracting blue color light from the window member 29, a small size, high resolution, two dimensional display element having high efficiency, high image quality, and which is capable of color display by the three colors of red, green and blue, and a display device including the display element, can be achieved.

With the configuration as described above, the waveguide 13 and the resonators 14 may be configured to operate only in an extremely narrow wavelength region that is substantially close to a single wavelength. According to this configuration, a small size, high resolution, two dimensional display element having high efficiency, high image quality, and which is capable displaying a plurality of colors, for example the three colors of red, green and blue, and a display device including the display element, can be achieved.

It should be noted that although a two dimensional photonic crystal is used for the element structure in the embodiments described above, a three dimensional photonic crystal such as a diamond opal structure or a woodpile structure may also be used. Control of the entrapment and extraction of light can be performed with greater efficiency by using a three dimensional photonic crystal.

Figure 15A:
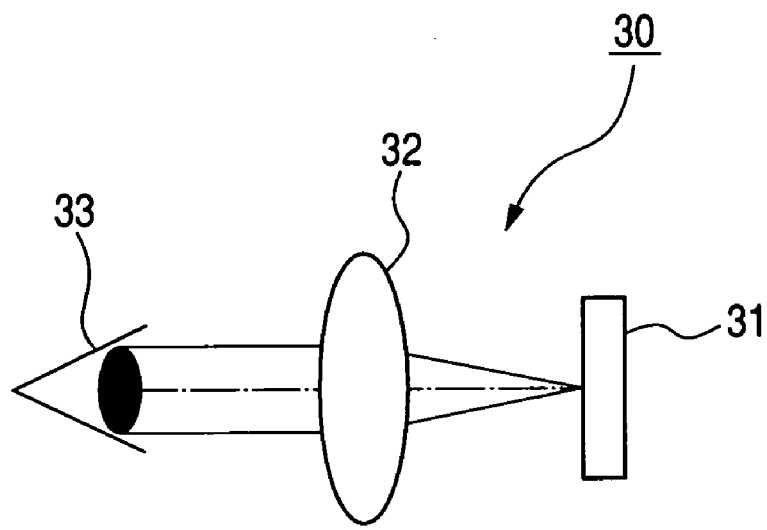
FIGS. 15A and 15B are diagrams that explain Embodiment 8 of an image observation system and an image projection system, respectively, of the present invention.
Figure 15B:
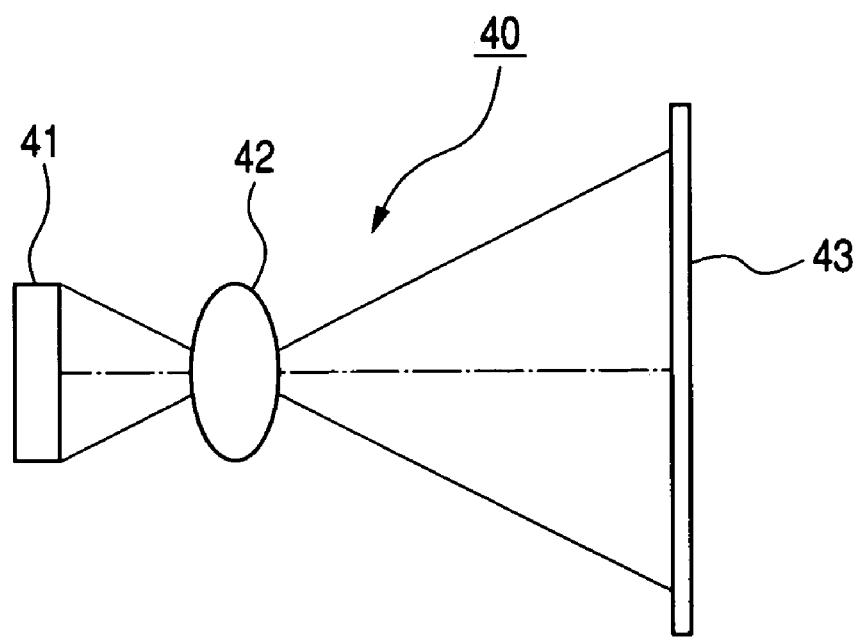
Figure 16:
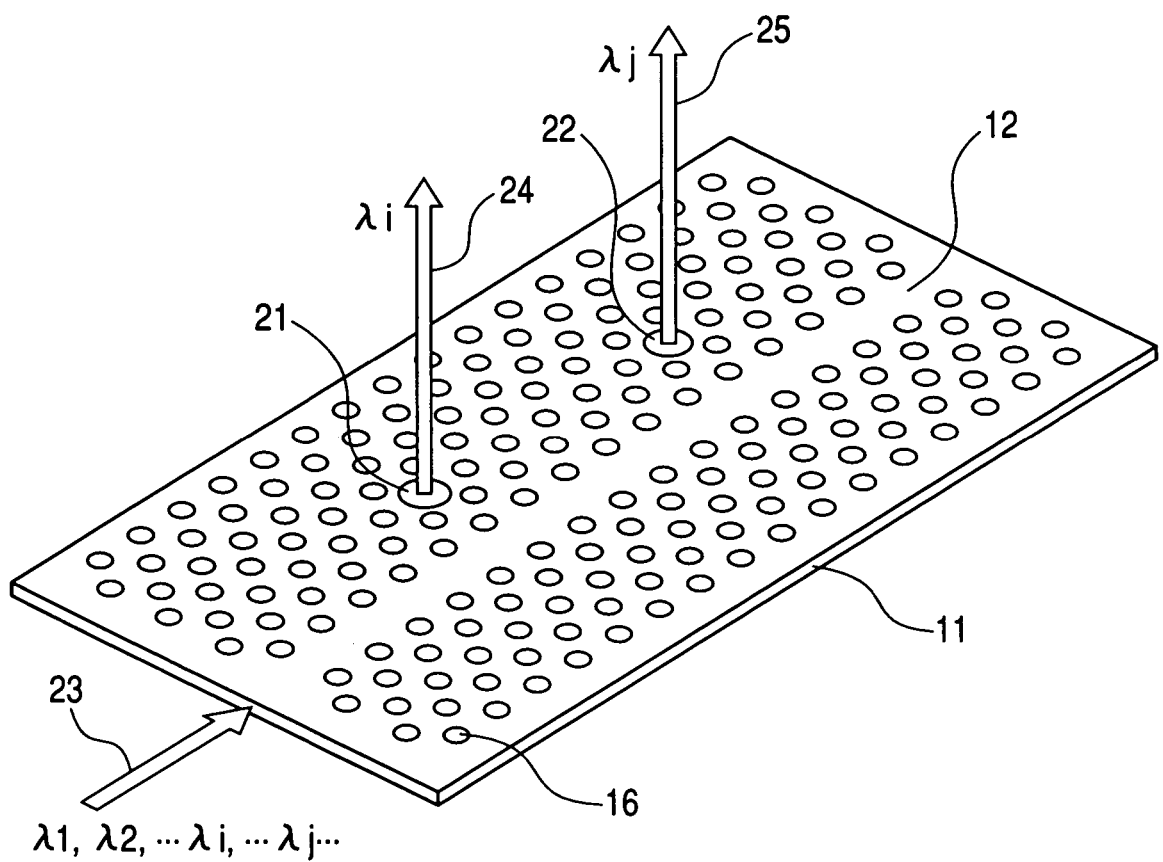
FIG. 16 is a diagram that shows waveguides and wavelength demultiplexers in two dimensional photonic crystal slabs.

FIGS. 15A and 15B are schematic diagrams of main portions of an image observation system and an image projection system, respectively, according to Embodiment 8 of the present invention, which use the display element of the present invention. An image observation system 30 of FIG. 15A has a display element 31 of any of the embodiments described above, and an eyepiece optical system 32. By guiding an enlarged virtual image of a display surface of the display element 31 to the observer's eye 33, an observer can observe an image displayed in the display element 31 through the eyepiece optical system 32. An image projection system 40 of FIG. 15B has a display element 41 of any of the embodiments described above, and a projection optical system 42. The projection optical system 42 forms an enlarged real image of a display surface of the display element 41 on a screen 43.

As described above, an image display system, an image projection system, a portable information terminal, or the like having a small size, high resolution, high image quality, and low energy consumption due to high efficiency can thus be achieved by using the display element according to the present invention.

According to the present invention as described above, a small size, high resolution element structure which provides an extremely high utilization efficiency of light emitted from the light source means and achieves high contrast when used in a display element can be obtained. In addition, a display element having the element structure can be obtained.

This application claims priority from Japanese Patent Application Nos. 2004-099142 filed Mar. 30, 2004 and 2004-111228 filed on Apr. 5, 2004 which are hereby incorporated by reference herein.

What is claimed is:

1. A display element comprising:
    a two dimensional or three dimensional photonic crystal having a photonic band gap in a predetermined wavelength region;
    light source means; and
    control means,
    wherein the photonic crystal has a waveguide made from a linear defect, and a plurality of resonators made from point defects disposed close to the waveguide,
    wherein the light source means guides light of the predetermined wavelength region to the waveguide, wherein a resonance wavelength of each of the resonators can be changed according to a control signal from the control means, wherein the control means effects a control between: a first state in which light within the waveguide is emitted to an outside of the photonic crystal by setting the resonance wavelength to match a wavelength of the light guided from the light source means; and a second state in which emission of the light within the waveguide to the outside of the photonic crystal is blocked by setting the resonance wavelength to a wavelength that differs from the wavelength of the light guided from the light source means, and wherein the plurality of resonators form pixels.

2. A display element according to claim 1, further comprising a wavelength converter portions corresponding to the plurality of resonators.

3. A display element according to claim 2, wherein the wavelength converter portions convert light from the light source means emitted to the outside of the photonic crystal into at least two different wavelengths.

4. A display element according to claim 3, wherein the wavelength converter portions comprise a plurality of fluorescent substances that are excited by the light from the light source means and emit light having at least two colors among red, green, and blue.

5. A display element according to claim 1, wherein the control means sends control signals that determine a light emission state in sequence to the plurality of the resonators within a predetermined period.

6. A display element according to claim 5, wherein the control means sends a control signal, which determines an intensity of the light guided to the waveguide, to the light source means in synchronism with the control signals sent to the plurality of resonators.

7. A display element according to claim 1,
wherein the light source means guides light containing a plurality of wavelengths to the waveguide, and
wherein the resonance wavelength of each of the plurality of resonators is capable of being set to any one wavelength from among the plurality of wavelengths.

8. A display element according to claim 1, wherein the plurality of resonators are disposed on both sides of the waveguide.

9. A display element according to claim 1,
wherein a plurality of the waveguides are arranged parallel to each other, and
wherein a plurality of the light source means are provided corresponding to the plurality of the waveguides.

10. A display element according to claim 1,
wherein the plurality of resonators each comprise a non-linear medium whose refractive index changes when applied with an electric field or current from an external portion, and
wherein the control means controls the resonance wavelength of each of the resonators by changing the refractive index of the non-linear medium.

11. A display element according to claim 1,
wherein the light source means guides light of a single wavelength to the waveguide, and
wherein the resonance wavelength of each of resonators is capable of being set to the wavelength of the light guided to the waveguide.

12. A display element according to claim 1, wherein the light source means is a photonic crystal laser made from the photonic crystal that forms the resonators.

13. A display element according to claim 1, further comprising a light blocking portion provided on a display surface side of the display element excluding portions above the resonators.

14. An image observation system for observing an image displayed on the display element according to any one of claims 1 to 13 through an eyepiece optical system.

15. An image projection system which projects an image displayed on the display element according to any one of claims 1 to 13 onto a predetermined surface by a projection optical system.

* * * * *